United States Patent
Kato et al.

(10) Patent No.: US 9,874,290 B2
(45) Date of Patent: Jan. 23, 2018

(54) VALVE DEVICE

(71) Applicants: KEIHIN CORPORATION, Tokyo (JP); HONDA MOTOR CO., LTD., Tokyo (JP)

(72) Inventors: Takahide Kato, Utsunomiya (JP); Koji Hakoda, Tochigi-ken (JP); Takahiro Sasaki, Utsunomiya (JP); Tomohiko Hatakeda, Tochigi-ken (JP); Satoshi Inoue, Sakura (JP)

(73) Assignees: KEIHIN CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/083,881

(22) Filed: Mar. 29, 2016

(65) Prior Publication Data

US 2016/0290522 A1  Oct. 6, 2016

(30) Foreign Application Priority Data

Mar. 30, 2015 (JP) .................. 2015-069499

(51) Int. Cl.
*F16K 27/02* (2006.01)
*F16K 31/06* (2006.01)

(52) U.S. Cl.
CPC ........ *F16K 27/029* (2013.01); *F16K 31/0655* (2013.01)

(58) Field of Classification Search
CPC ....................... F16K 27/029; F16K 31/0655
See application file for complete search history.

(56) References Cited

U.S. PATENT DOCUMENTS

| | | | | |
|---|---|---|---|---|
| 6,619,615 B1* | 9/2003 | Mayr | ........................ | H01F 7/13 251/129.02 |
| 6,948,697 B2* | 9/2005 | Herbert | ............... | F16K 31/0672 251/129.04 |
| 7,021,256 B2* | 4/2006 | Wagner | ............... | F16K 31/0637 123/90.11 |
| 2002/0145125 A1* | 10/2002 | Tomoda | .............. | F16K 31/0631 251/129.15 |
| 2013/0248743 A1* | 9/2013 | Kasagi | ................ | F16K 31/0613 251/129.15 |
| 2013/0264507 A1* | 10/2013 | Schnelker | ........... | F16K 31/0665 251/129.15 |

FOREIGN PATENT DOCUMENTS

JP       2009-281452       12/2009

* cited by examiner

*Primary Examiner* — Eric Keasel
(74) *Attorney, Agent, or Firm* — Rankin, Hill & Clark LLP

(57) ABSTRACT

A valve device is equipped with a body, a valve element drive mechanism, and a housing. The body has a tubular insertion section, in which a movable member of the valve element drive mechanism is inserted. A first flange is formed at an end of the insertion section that faces the housing. Furthermore, a ring is fitted externally on an outer side wall of the first flange. By projections, which are provided on an inner side wall of the ring, being embedded in an outer side wall of the insertion section, the ring is made integral with the first flange. The housing is of a bottomed tubular shape that covers the valve element drive mechanism, and an edge of an open end of the housing is crimped to the first flange through the ring.

6 Claims, 4 Drawing Sheets

VALVE DEVICE

CROSS-REFERENCE TO RELATED APPLICATION

This application is based upon and claims the benefit of priority from Japanese Patent Application No. 2015-069499 filed on Mar. 30, 2015, the contents of which are incorporated herein by reference.

BACKGROUND OF THE INVENTION

Field of the Invention

The present invention relates to a valve device in which a housing is attached by crimping to a body made of resin.

Description of the Related Art

As a valve device, for example, a technical concept therefor is disclosed in Japanese Laid-Open Patent Publication No. 2009-281452. Concerning the valve device of Japanese Laid-Open Patent Publication No. 2009-281452, an open end of a bottomed tubular shaped cover member is crimped to a resin body in which a flow path is formed, and in the interior of the cover member, there are accommodated a valve element, and a valve element drive mechanism for displacing the valve element. With the valve device, the cover member is crimped through a metallic part attached to the body, in order to suppress a deterioration in product quality caused by cracks or the like that are generated in the resin body by stress applied when the cover member is crimped. The metallic part includes a plurality of through holes that penetrate in the axial direction through a ring shaped main body, and by subjecting the body to insert molding while resin is made to flow respectively in the through holes, the metallic part is made integral with the body.

SUMMARY OF THE INVENTION

With the above-described valve device, it is inherently desirable for the resin to flow into each of the through holes at the time that insert molding is performed. However, in practice, it is difficult to ensure that the resin will flow evenly within all of the through holes, and there is a concern that a so-called filling shortage may occur. In this case, defective molding is likely to occur, and it becomes difficult for the metal member to sufficiently receive the load generated at the time of a crimping process.

A principal object of the present invention is to provide a valve device that can be obtained with a simple structure and manufacturing process.

Another object of the present invention is to provide a valve device that exhibits enhanced product quality.

According to an embodiment of the present invention, a valve device is provided, including a body made of resin, the body having a flow path through which a fluid flows, a valve element configured to be seated on or separated away from a valve seat formed in the flow path, a valve element drive mechanism configured to displace the valve element in a direction to be seated on or separated away from the valve seat, and a bottomed tubular shaped housing configured to cover the valve element drive mechanism. Further, in the valve device, the body has a tubular insertion section, in which a movable member of the valve element drive mechanism is inserted, a flange is formed at an end of the insertion section that faces the housing, a metal ring is fitted externally on an outer side wall of the flange, the metal ring having a projection formed on an inner wall thereof, the projection being embedded in the outer side wall of the flange, and an open end of the housing is fixed to the body by being crimped to the flange through the ring.

In the valve device according to the present invention, since the body is constituted from a resin material, for example, compared to the case of the body being constructed from a metal or the like, the valve device can be made lighter in weight. Further, the ring is integrated with the insertion section of the body, and an open end of the housing is crimped with respect to the ring. Consequently, when the housing is crimped, since imposition of stress on the body can be avoided, generation of cracking or the like can be suppressed. Furthermore, with a simple configuration in which the projection provided on the inner circumference of the ring is embedded in the outer side wall of the flange, the flange and the ring are made integral. Thus, a valve device can be obtained in which product quality is improved, without requiring a complicated manufacturing process.

In the aforementioned valve device, the projection may include a plurality of projections, which are arranged along a circumferential direction of the ring at intervals. In this case, since the resin that forms the flange is interposed between the respective projections of the ring, rotation of the ring with respect to the flange can be restricted.

In the aforementioned valve device, the flange and the ring may be integrated together by insert molding. In this case, because there is no need to separately carry out the process for forming the body and the process for attaching the ring to the flange, it is possible to further simplify the process of manufacturing the valve device.

In the valve device for which insert molding is performed in the manner described above, preferably, the projection has a site that contacts the flange, and at least a portion of the site is formed in a curved shape. In this case, insert molding can be carried out while molten resin is made to flow effectively into a mold from which the body is obtained. Further, since corners on which internal stress are concentrated can be prevented from being formed on the flange, generation of cracks or the like can effectively be suppressed. Consequently, the product quality of the valve device can be further improved.

According to the present invention, with a simple configuration in which the projections of the ring are embedded in the flange that is formed in the insertion section of the body, the flange and the ring can be made integral. Thus, a valve device can be obtained in which product quality is improved, without requiring a complicated manufacturing process.

The above and other objects features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a valve device according to the present invention will be described in detail below with reference to the accompanying drawings.

With the present embodiment, an example will be described in which the valve device is a discharge valve for a fuel cell, the discharge valve being provided in a discharge line for discharging fluids such as a fuel gas and residual water, etc., from an anode of a solid polymer electrolyte membrane fuel cell. However, the valve device according to the present invention is not particularly limited to such an example, and can be applied similarly with respect to a flow path in which adjustment of the flow rate of a fluid is necessary.

Figure 1:
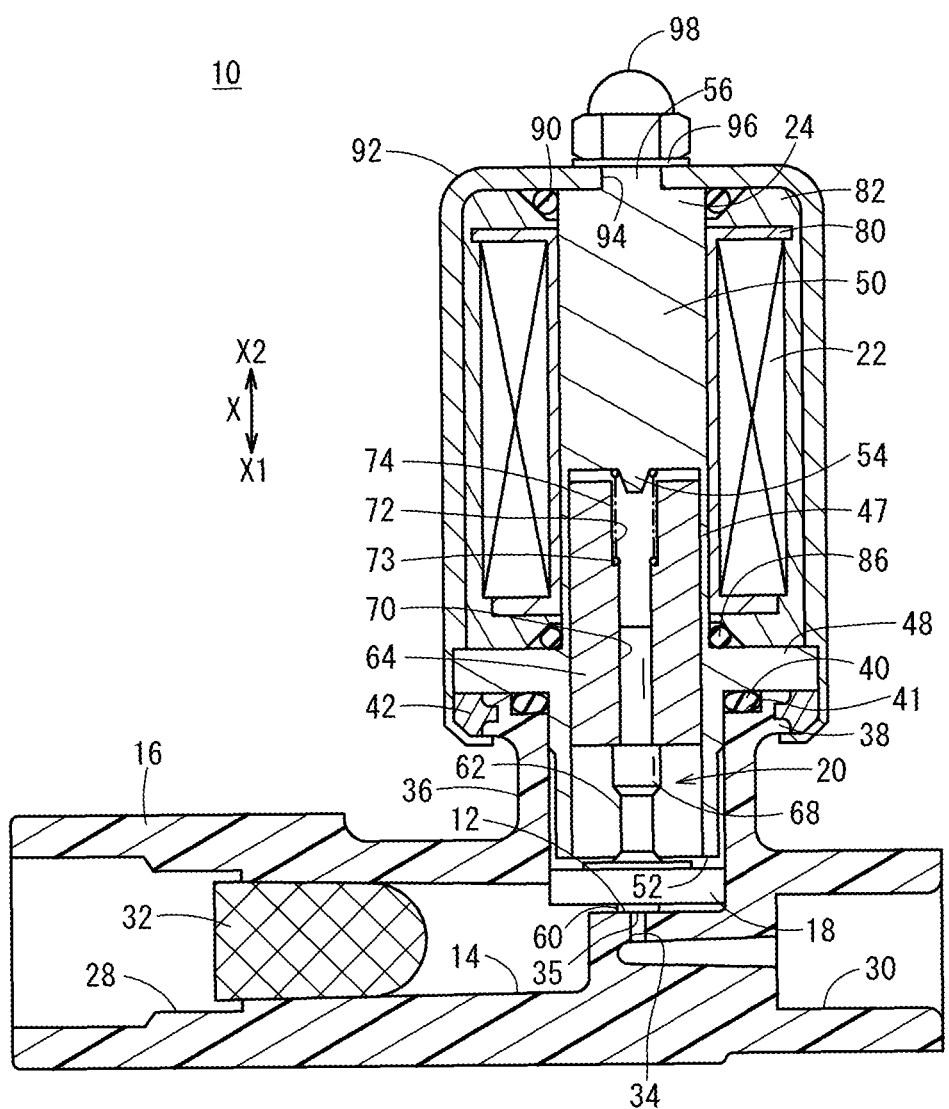
FIG. 1 is a vertical cross-sectional view showing a valve-closed state of a valve device according to an embodiment of the present invention.
Figure 2:
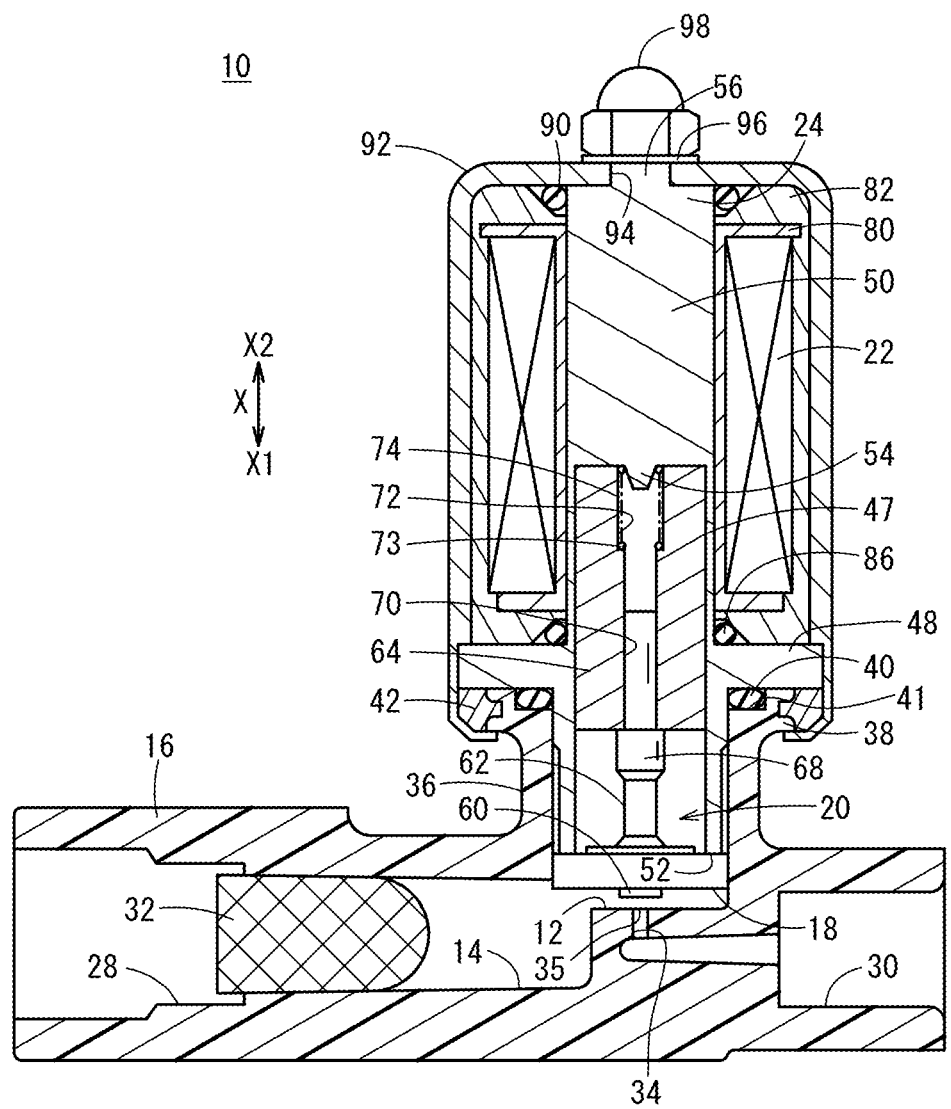
FIG. 2 is a vertical cross-sectional view showing a valve-open state of the valve device shown in FIG. 1.

As shown in FIGS. 1 and 2, the valve device 10 according to the present embodiment is equipped with a body 16 in which a flow path 14 having a valve seat surface 12 (valve seat) is formed, a movable member 20 on which a valve element 18 is provided, a solenoid 22 that displaces the movable member 20 upon excitation thereof so that the valve element 18 is seated on or separated away from the valve seat surface 12, and a fixing member 24. The movable member 20, the solenoid 22, and the fixing member 24 constitute a valve element drive mechanism.

The configuration of these elements will now be described in greater detail. The body 16, for example, is made up from a resin such as polyphenylene sulfide (PPS) or the like, with the flow path 14 being formed in the interior thereof. An exhaust fluid containing a hydrogen containing gas as a fuel gas, which is discharged from the anode of a fuel cell (not shown), and residual water flow through the flow path 14. Further, the flow path 14 includes an inlet port 28 on an upstream side into which the exhaust fluid is introduced, and an outlet port 30 on a downstream side through which the exhaust fluid is discharged. A mesh filter 32 for capturing dust or debris, etc., in the case that such dust or debris is contained within the exhaust fluid, is mounted integrally in the inlet port 28.

The inlet port 28 and the outlet port 30 communicate with each other through a communication passage 34 that extends in the axial direction (the direction of the arrow X in FIG. 1) of the later-described movable member 20. More specifically, the communication passage 34 is a portion of the flow path 14, one end side (the X2 side in FIG. 1) of which in the direction of the arrow X communicates with the inlet port 28, and the other end side (the X1 side in FIG. 1) of which communicates with the outlet port 30. The periphery of an opening 35 on the X2 side of the communication passage 34 functions as a valve seat surface 12 (valve seat).

The body 16 integrally possesses an insertion section 36 that is erected along the direction of the arrow X. The insertion section 36 is formed in a cylindrical tubular shape, and a portion of the valve element 18 enters into a hollow interior of the insertion section 36. The flow path 14 and the hollow space of the insertion section 36 are isolated from one another by the valve element 18. Further, on the X2 side end of the insertion section 36, a first flange 38 (flange) is provided that extends radially outward therefrom, and on the inner circumferential side of the first flange 38, a stepped portion 41 is provided on which an annular seal member 40 is arranged.

A ring 42 is disposed on an outer side wall of the first flange 38. The ring 42 is an annular body made from a metal such as stainless steel or the like, and the ring 42 is made integral with the first flange 38 by insert molding.

Figure 3A:
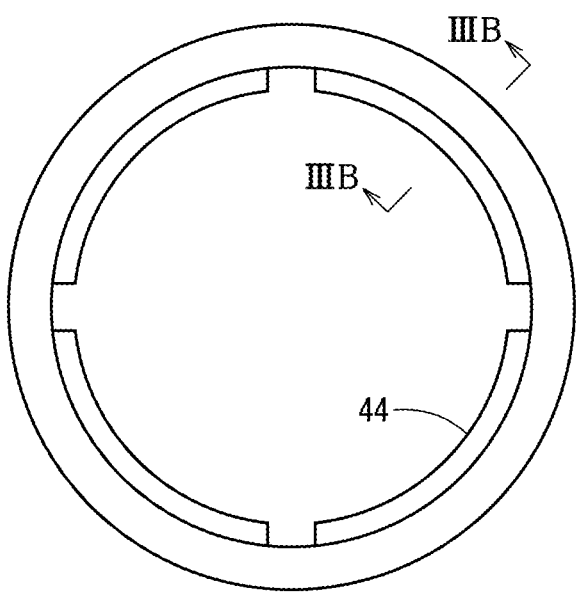
FIG. 3A is a plan view of a ring that makes up the valve device of FIG. 1.

As shown in FIG. 3A, four projections 44 are disposed in circular arcuate shapes on the inner wall of the ring 42. The projections 44 are separated from each other at predetermined intervals along the circumferential direction of the ring 42, and are embedded in the outer side wall of the first flange 38. By being embedded in this manner, falling off of the ring 42 from the first flange 38 is prevented. Of course, the resin, i.e., material thereof, that constitutes the first flange 38, is interposed between the adjacent projections 44 themselves.

Figure 3B:
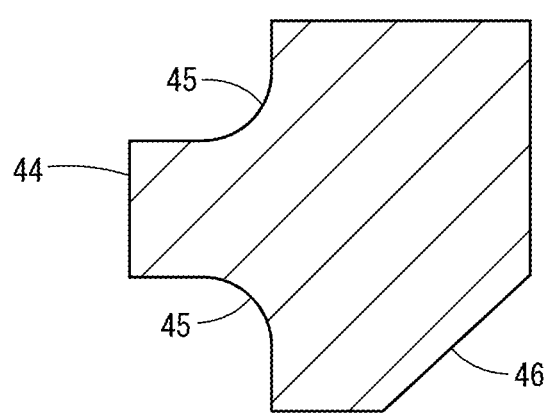
FIG. 3B is a cross sectional view taken along line IIIB-IIIB of FIG. 3A.

As shown in FIG. 3B, which is a cross-sectional view taken along line IIIB-IIIB of FIG. 3A, rising portions 45 of the projections 44, which rise with respect to the inner wall of the ring 42, are curved in arcuate shapes (round shapes). The rising portions 45 are surrounded by the resin (material) that makes up the first flange 38. Stated otherwise, the periphery of the rising portions 45 is filled with the resin. Furthermore, an inclined location 46, which is inclined inwardly from the X2 side to the X1 side, is provided on the outer circumferential side of the ring 42.

The fixing member 24 is formed integrally, for example, from a single material made up from a magnetic material such as magnetic stainless steel. The fixing member 24 is equipped with a hollow cylindrically shaped guide member 47, a second flange 48 that projects radially outward from a substantially central portion of the guide member 47 in the longitudinal direction of the guide member 47, and a substantially cylindrical shaped solid core section 50 that extends from the X2 side end of the guide member 47.

As shown in FIGS. 1 and 2, the X1 side end of the guide member 47, which is located on the X1 side with respect to the second flange 48, is inserted inside the insertion section 36. Further, the X1 side end, which forms one end of the guide member 47 in the longitudinal direction and which is inserted inside the insertion section 36, constitutes a stopping section 52 (to be described later). The stopping section 52 is arranged at a predetermined distance away from the valve seat surface 12.

As noted above, the guide member 47 is of a hollow cylindrical shape, and in the interior thereof, the movable member 20 that makes up the valve element drive mechanism is accommodated so as to be displaceable along the direction of the arrow X. The movable member 20 will be described later.

The X1 side end surface of the second flange 48 abuts against the X2 side end surfaces of the first flange 38 and the ring 42. At this time, the seal member 40 is interposed between the first flange 38 and the second flange 48, thereby sealing the site between the fixing member 24 and the body 16.

A spring receiving projection 54, which projects out while reducing in diameter in a tapered shape toward the valve element 18, is formed on the X1 side end of the core section 50. More specifically, the spring receiving projection 54 is arranged inside of the guide member 47. On the other hand, a screw section 56 having male threads (not shown) thereon is formed to project on the X2 side end of the core section 50. The spring receiving projection 54 and the screw section 56 also are formed integrally as the fixing member 24 from the aforementioned single material.

The valve element 18, for example, is made up from a substantially disk shaped body formed from a metal or the like, which is covered by an elastic material such as fluorine-containing rubber or the like, and has a larger diameter than the outer diameter of the guide member 47. The valve element 18 is arranged between the valve seat surface 12 and the stopping section 52 of the guide member 47, and at a location of the valve element 18 that faces the opening 35 of the communication passage 34, there is provided a seat member 60, which closes the opening 35 by being seated on the valve seat surface 12, the seat member 60 being formed from the aforementioned elastic material. More specifically, the seat member 60 projects out annularly from the X1 side end surface of the valve element 18, so as to be greater in diameter than the opening 35.

The valve element 18 is displaced integrally or in unison with the movable member 20. The movable member 20 includes a shaft member 62 with the valve element 18 being arranged on the X1 side end thereof, and a magnetic member 64.

The shaft member 62 is formed from a metal material and extends toward the X2 side from the valve element 18. Further, the shaft member 62 has an expanded diameter portion 68 formed thereon, and a portion of the shaft member 62 that is located on the X2 side with respect to the expanded diameter portion 68 is inserted and fitted into a fitting hole 70 of the magnetic member 64.

The magnetic member 64 is formed in a cylindrical shape from a magnetic material, and in the interior thereof, there are formed the fitting hole 70 in which the shaft member 62 is inserted and fitted as described above, and a spring receiving hole 72 which is larger in diameter than the fitting hole 70. A return spring 74 is interposed between a stepped part 73 that is formed between the spring receiving hole 72 and the fitting hole 70, and the spring receiving projection 54 that is provided on the core section 50. An elastic force of the return spring 74 biases the movable member 20 in a direction away from the fixing member 24.

Stated otherwise, by being biased elastically by the return spring 74, or by being pulled by magnetic attraction toward the core section 50, the movable member 20 is capable of being displaced in the directions of the arrow X in the interior of the guide member 47. Further, on at least a portion of mutually sliding surfaces of the magnetic member 64 and the guide member 47, for example, a coating of polytetrafluoroethylene (PTFE) or the like, which is capable of reducing frictional force, preferably is applied.

In a state in which the movable member 20 is biased elastically by the return spring 74, as shown in FIG. 1, the valve element 18 is seated on the valve seat surface 12. On the other hand, displacement of the valve element 18 in a direction (valve opening direction) away from the valve seat surface 12 is restricted by abutment of the valve element 18, which is greater in diameter than the stopping section 52, against the stopping section 52 of the guide member 47.

The solenoid 22 is arranged on the X2 side with respect to the second flange 48 of the fixing member 24. The solenoid 22 comprises a coil that is wound around a cylindrical shaped bobbin 80. Portions of the core section 50 and the guide member 47 are inserted in a through hole formed substantially in the center of the bobbin 80. Stated otherwise, the portions of the core section 50 and the guide member 47 are surrounded by the solenoid 22. In addition, by the bobbin 80 being supported on the second flange 48 through a cover member 82, the solenoid 22 is supported on the second flange 48.

The bobbin 80 is surrounded by the cover member 82. The cover member 82 is made from a resin material, for example, and on a side surface thereof, there is provided a connector connected to a power source (neither of which are shown) for supplying electric current to the solenoid 22. An o-ring 86 is disposed on the X1 side of the cover member 82, and another o-ring 90 is disposed on the X2 side thereof. The o-ring 86 and the o-ring 90 serve to suppress vibrations, which accompany displacement of the aforementioned valve element 18 and the movable member 20, from being transmitted to the solenoid 22.

The outside of the cover member 82 and the majority of the fixing member 24 are covered by a housing 92. Accordingly, the solenoid 22 also is accommodated in the interior of the housing 92.

The housing 92, for example, is formed from a magnetic material made of a cold-rolled steel plate or the like, and the X1 side end of the housing 92 is crimped so as to surround the outer side wall of the ring 42 and cover the X1 side end surface thereof. By being crimped in this manner, the second flange 48, the cover member 82, and the bobbin 80 (solenoid 22) are gripped between the first flange 38 and the housing 92.

A through hole 94 through which the screw section 56 of the core section 50 is inserted is formed in the X2 side end of the housing 92. A cap nut 98 is screw-engaged via a sealing washer 96 on the screw section 56 that is inserted through the through hole 94. Stated otherwise, the housing 92 is fixed to the body 16 through the ring 42 and also fixed to the fixing member 24 through the screw section 56 and the cap nut 98.

The valve device 10 according to the present embodiment is constructed basically as has been described above. Next, operations and advantages of the valve device 10 will be described.

In FIG. 1, a condition (valve closed state) is shown, which is a non-excited state in which electric current is not supplied with respect to the solenoid 22, and thus the valve element 18 is seated on the valve seat surface 12, and communication between the inlet port 28 and the outlet port 30 is blocked. In such a valve closed state, when the solenoid 22 is energized under the urging of a non-illustrated power source, the solenoid 22 becomes excited. Under such an excitement action, a magnetic flux is generated in such a circulating manner that the magnetic flux is directed from the solenoid 22 to the magnetic member 64 of the movable member 20, and then returns again to the solenoid 22. Accompanying the excitation thereof, the core section 50 of the fixing member 24 magnetically attracts the movable member 20. As a result, the movable member 20 moves toward the X2 side, or more specifically in a valve opening direction, in opposition to the biasing force of the return spring 74, whereupon the valve element 18, which is disposed on the X1 side of the movable member 20, moves in a direction away from the valve seat surface 12 together with compressing the return spring 74.

In addition, as shown in FIG. 2, the X2 side end surface of the valve element 18 abuts against the stopping section 52 of the guide member 47. Therefore, beyond this point, it becomes impossible for the valve element 18 to be displaced upwardly toward the X2 side. Consequently, the stopping section 52 functions as a stopper that engages with the valve element 18 and restricts further displacement thereof.

Further, accompanying separation of the valve element 18 away from the valve seat surface 12, a condition (valve open state) is brought about in which the inlet port 28 and the outlet port 30 are placed in communication through the communication passage 34. Owing thereto, the exhaust fluid, which is exhausted from the anode of the fuel cell, passes through the inlet port 28, and thereafter, flows to the communication passage 34 from a clearance between the valve element 18 and the valve seat surface 12, and is led to the outlet port 30. As a result, the exhaust fluid is discharged to the exterior of the fuel cell.

From such a valve open state, in the event that discharging of the exhaust fluid is to be stopped again, the supply of electric current with respect to the solenoid 22 is stopped. Consequently, the solenoid 22 is placed in a non-excited state, whereby excitation of the core section 50 is eliminated, and as a result, a force to attract the magnetic member 64 disappears. Therefore, the return spring 74 is expanded, and by the biasing force thereof, the valve element 18 of the movable member 20 is displaced in the valve closing direction (to the X1 side) where it abuts against the valve seat surface 12. Accordingly, as shown in FIG. 1, the valve element 18 of the movable member 20 once again is seated on the valve seat surface 12, and a valve closed state can be established in which communication between the inlet port 28 and the outlet port 30 is blocked. As a result, discharging of the exhaust fluid is stopped.

In this case, according to the present embodiment, the guide member 47 (stopping section 52), the second flange 48, and the core section 50 of the fixing member 24 are formed integrally by a single element made up from a magnetic material. Therefore, there exists no junction site on the fixing member 24. Consequently, the occurrence of a gap through which leakage of fluid may take place can be avoided. Therefore, within the aforementioned flow path, even if the exhaust fluid enters from the flow path 14 into the interior of the insertion section 36, and further enters into the interior of the guide member 47 of the fixing member 24, the flow path 14 is dammed at the interior of the fixing member 24.

More specifically, according to the present embodiment, airtightness in the interior of the valve device 10 can be improved more than adequately. Despite the fact that hydrogen having a comparatively small molecular diameter is contained in the exhaust fluid, the occurrence of fluid leakage can effectively be suppressed.

Further, with the fixing member 24, the guide member 47 is constituted from a magnetic material in the same manner as the core section 50. Accordingly, the magnetic flux pathway between the solenoid 22 and the movable member 20 can be enhanced, and magnetic efficiency can be improved. Therefore, an improvement in the response speed is achieved.

In addition, the fixing member 24 can be manufactured, for example, by carrying out cutting or machining with respect to a single material. Such a machining apparatus is lower in cost than a welding apparatus. Therefore, since the capital investment for fabricating the fixing member 24 is reduced in cost, there is an advantage in that production costs for obtaining the valve device 10 can be reduced.

When the valve device 10 is assembled, the body 16 is fabricated, for example, by injection molding of a molten resin into a mold. The ring 42 may be accommodated beforehand in an insertion section forming portion in the interior of the mold. More specifically, in this case, the ring 42 is made integral with respect to the first flange 38 of the body 16 by insert molding.

The molten resin flows into the insertion section forming portion, and by reaching the inner wall of the ring 42, encloses the projections 44. Since the inner wall of the ring 42 is provided with only the projections 44, the molten resin can easily flow around the projections 44. In this state, by cooling and curing of the molten resin, the projections 44 of the ring 42 become embedded in the first flange 38, and the body 16 is obtained in which the first flange 38 and the ring 42 are made integral with one another.

In this case, the rising portions 45 of the projections 44, which rise with respect to the inner wall of the ring 42, are formed as rounded parts that are curved in arcuate shapes. Stated otherwise, so-called chamfering is effected thereon. When the resin contracts upon cooling and curing thereof, cracking generally tends to occur at locations in contact with sharp corners due to concentration of internal stress. However, according to the present embodiment, because chamfering is effected on the rising portions 45, it is unlikely for such internal stress to be concentrated on the rising portions 45. Consequently, the occurrence of cracking can effectively be suppressed, and thus it is possible to improve the product quality of the valve device 10.

Further, since the first flange 38 and the ring 42 are formed integrally by insert molding, there is no need to separately carry out the process for forming the body 16 and the process for attaching the ring 42 to the first flange 38. Consequently, it is possible to further simplify the process of manufacturing the valve device 10.

Furthermore, the material (resin) that constitutes the first flange 38 is interposed between the four adjacent projections 44 themselves, which are disposed along the circumferential direction of the ring 42. In this manner, rotation of the ring 42 with respect to the first flange 38 can be suppressed. Stated otherwise, the ring 42 can be stopped from rotating. At the same time, falling off of the ring 42 from the first flange 38 can be prevented.

The valve element 18, the valve element drive mechanism, and the cover member 82 are assembled with respect to the body 16, which is obtained as described above. Furthermore, the cover member 82 is covered by the housing 92, such that an edge of the open end of the housing 92 is bent toward the X1 side end surface of the first flange 38 so as to surround the ring 42. More specifically, crimping is carried out, whereby the housing 92 is fixed to the body 16.

Since the ring 42 is fitted externally on an outer side wall of the first flange 38, the ring 42 receives a load generated when crimping is carried out. Consequently, since imposition of stress on the first flange 38 can be avoided, generation of cracking or the like in the first flange 38 (body 16) can be suppressed. Thus, as noted above, with a simple configuration in which the projections 44 provided on the inner circumference of the ring 42 are embedded in the outer side wall of the first flange 38, the first flange 38 and the ring 42 are made integral. Thus, the valve device 10 can be obtained in which product quality is improved, without requiring a complicated manufacturing process.

In addition, with the valve device 10 according to the present embodiment, since the body 16 is constituted from a resin material, for example, compared to the case of the body 16 being constructed from a metal or the like, the valve device 10 can be made lighter in weight.

The present invention is not particularly limited to the above-described embodiment, and it is a matter of course that various modifications thereto are possible without departing from the scope of the present invention.

Figure 4A:
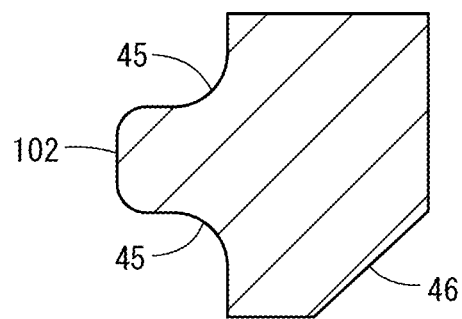
FIG. 4A, FIG. 4B, and FIG. 4C are each a cross-sectional view along a thicknesswise direction of a ring according to each modification.
Figure 4B:
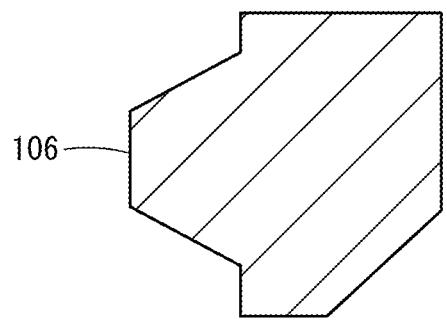
Figure 4C:
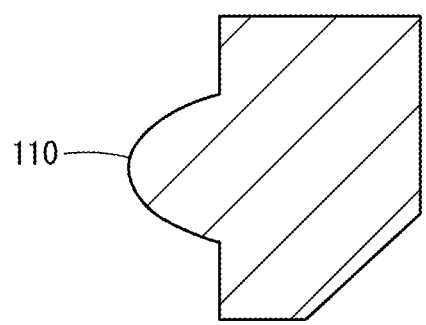

For example, the ring 42 of the valve device 10 according to the aforementioned embodiment is not limited to the shape illustrated in FIGS. 3A and 3B, and the ring may have, as modifications thereof, the shapes illustrated in FIGS. 4A, 4B, and 4C, etc. Among the structural elements shown in FIGS. 4A to 4C, elements thereof that are the same or have similar functions as the structural elements shown in FIG. 3B are denoted by the same reference characters, and detailed description of such features is omitted.

The ring 100 shown in FIG. 4A, instead of the projections 44, is equipped with projections 102 having a rounded corner square shape, while apart therefrom, the ring 100 is constituted in the same manner as the ring 42. Further, the ring 104 shown in FIG. 4B includes projections 106 that are reduced in diameter in tapered shapes toward the ends of the projections from the inner circumferential surface of the ring 104. Furthermore, the ring 108 shown in FIG. 4C includes projections 110 that project in arcuate shapes (curved shapes) from the inner circumferential surface of the ring 108.

The projections shown in FIG. 3B and FIGS. 4A to 4C are but examples, and the projections are not limited to the illustrated shapes, insofar as it remains possible for the first flange 38 and the ring 42 to be made integral by the projections being embedded in the first flange 38.

Further, with the valve device 10 according to the above-described embodiment, although the first flange 38 and the ring 42 are formed integrally by insert molding, the invention is not particularly limited to this feature, and for example, they may be integrated after the body 16 and the ring 42 have each been formed separately by separate processes or steps.

Furthermore, with the valve device 10 according to the above-described embodiment, although the number of projections 44 formed on the inner circumferential surface of the ring 42 is four, a single projection 44 constituted from one ring shape that is formed continuously in the circumferential direction may be formed thereon, or plural projections other than four projections may be formed thereon.

Further, the valve device 10, for example, may also be disposed in an exhaust line through which an exhaust fluid is guided from a cathode of the fuel cell.

What is claimed is:

1. A valve device comprising:
    a body made of resin, the body having a flow path through which a fluid flows;
    a valve element configured to be seated on or separated away from a valve seat formed in the flow path;
    a valve element drive mechanism including a movable member operably coupled to the valve element to move the valve element in a direction to be seated on or separated away from the valve seat; and
    a tubular shaped housing covering the valve element drive mechanism;
    wherein:
    the body has a tubular insertion section, in which the movable member of the valve element drive mechanism is inserted;
    a flange is formed at an end of the insertion section that faces the housing;
    a metal ring is fitted externally on an outer side wall of the flange, the metal ring having a plurality of projections formed on an inner wall thereof, the plurality of projections being separated from each other along a circumferential direction of the ring, and the plurality of projections being embedded in the outer side wall of the flange; and
    an open end of the housing is fixed to the body by being crimped to the flange through the ring.

2. The valve device according to claim 1, wherein the flange and the ring are integrated together by insert molding.

3. The valve device according to claim 2, wherein the plurality of projections each have a site that contacts the flange, and at least a portion of the site is formed in a curved shape.

4. The valve device according to claim 1, wherein the plurality of projections are embedded in the outer side wall of the flange with portions of the flange interposed between adjacent projections of the plurality of projections.

5. The valve device according to claim 4, wherein the open end of the housing is fixed to the body by being crimped to the flange through the ring, so that with a crimped portion of the body directly contacting the flange.

6. The valve device according to claim 1, wherein the open end of the housing is fixed to the body by being crimped to the flange through the ring, so that with a crimped portion of the body directly contacting the flange.

* * * * *